(12) United States Patent
Matthews

(10) Patent No.: US 9,258,525 B2
(45) Date of Patent: Feb. 9, 2016

(54) SYSTEM AND METHOD FOR REDUCING LATENCY IN VIDEO DELIVERY

(71) Applicant: Alcatel-Lucent USA Inc., Murray Hill, NJ (US)

(72) Inventor: Kim N. Matthews, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 75 days.

(21) Appl. No.: 14/188,868

(22) Filed: Feb. 25, 2014

(65) Prior Publication Data

US 2015/0244980 A1  Aug. 27, 2015

(51) Int. Cl.
| | |
|---|---|
| *H04N 7/15* | (2006.01) |
| *H04L 29/06* | (2006.01) |
| *G06T 3/00* | (2006.01) |
| *G06T 7/00* | (2006.01) |
| *G06T 7/20* | (2006.01) |
| *H04N 19/46* | (2014.01) |
| *H04N 19/54* | (2014.01) |
| *H04N 19/90* | (2014.01) |

(52) U.S. Cl.
CPC .............. *H04N 7/15* (2013.01); *G06T 3/0093* (2013.01); *G06T 7/0032* (2013.01); *G06T 7/2046* (2013.01); *H04L 65/607* (2013.01); *H04N 19/46* (2014.11); *H04N 19/54* (2014.11); *H04N 19/90* (2014.11)

(58) Field of Classification Search
CPC ............ H04N 7/14; H04N 7/15; H04N 7/152
USPC ........................................... 348/14.01–14.16
See application file for complete search history.

(56) References Cited

U.S. PATENT DOCUMENTS

| | | | |
|---|---|---|---|
| 5,861,920 A | 1/1999 | Mead et al. | |
| 7,084,877 B1 | 8/2006 | Panusopone et al. | |
| 8,633,963 B2 * | 1/2014 | Kamath et al. | 348/14.08 |
| 2003/0197779 A1 * | 10/2003 | Zhang et al. | 348/14.16 |
| 2004/0130614 A1 * | 7/2004 | Valliath et al. | 348/14.01 |

(Continued)

FOREIGN PATENT DOCUMENTS

EP       2490179 A1    8/2012

OTHER PUBLICATIONS

Eiser, P. et al., "Rate-distortion-efficient video compression using a 3-D head model," Image Processing, vo. 4, pp. 217-221, Oct. 24, 1999.

(Continued)

*Primary Examiner* — Melur Ramakrishnaiah
(74) *Attorney, Agent, or Firm* — Harness, Dickey & Pierce, P.L.C.

(57) ABSTRACT

A system and a method for producing a low-latency video for transmission over a network. The low-latency video may be created by modeling a select portion of original video data and comparing a current frame of the model against previous frames of the model in order to estimate the select portions of the original video data. The estimated, select portions of the original video data may be combined with a remainder of the original video data (such as background images) in order to produce the low-latency video. Model data and the original video data can be transmitted over the network using different paths in order to ensure that the model data is transmitted as quickly as possible, thereby allowing enough time for a morpher to process the model data before combining the model with the original video data.

20 Claims, 10 Drawing Sheets

(56) References Cited

U.S. PATENT DOCUMENTS

| | | | |
|---|---|---|---|
| 2005/0083248 A1* | 4/2005 | Biocca et al. | 345/8 |
| 2011/0292054 A1* | 12/2011 | Boker et al. | 345/473 |
| 2012/0155536 A1 | 6/2012 | Pace | |
| 2012/0249784 A1 | 10/2012 | Olson et al. | |
| 2014/0201329 A1* | 7/2014 | Himayat et al. | 709/219 |

OTHER PUBLICATIONS

Daewon S. et al., "Scalable H.264/AVC Video Transmission Over MIMO Wireless Systems with Adaptive Channel Selection Based on Partial Channel Information," IEEE Transactions on Circuits and Systems for Video Technology, vol. 17, No. 9, pp. 1218-1226, Sep. 1, 2007.

Fu, X. et al., "Video coding of model based at very low bit rates," Visual Communications and Image Processing, Jul. 8, 2003.

Takaya, K. et al., "Low bit-rate facial motion picture coding using image warping," Communications, Power and Computing, pp. 138-143, May 22, 1997.

Levoy, M "Polygon-Assisted JPEG and MPEG Compression of Synthetic Images," Proceedings of the 22nd Annual Conference on Computer Graphics and Interactive Techniques, pp. 21-28, Aug. 6, 1995.

Horne, C. et al., "SNHC Verification Model V4.1," MPEG Meeting, Jul. 13, 1997.

International Search Report and Written Opinion dated Apr. 10, 2015.

"Real-Time Rendering," 2nd edition, by Tomas Akenine-Moller & Eric Haines, 2002 (ISBN 1-56881-182-9, Chapter 5, p. 117-179).

Candide—A Parameterized Face, (2012). Retrieved Feb. 18, 2014, from http://icg.isy.liu.se/candide/main.html.

Opengl Programming Guide Chapter 9: Texture Mapping. Retrieved Feb. 18, 2014, from http://www.glprogramming.com/red/chapter09.html.

* cited by examiner

SYSTEM AND METHOD FOR REDUCING LATENCY IN VIDEO DELIVERY

BACKGROUND OF THE INVENTION

1. Field of the Invention

Example embodiments relate generally to wireless communication, and more particularly to a system and/or a method for reducing latency in two-way video conversations over a wireless (and/or wire-line) network. Jitter caused by latency due to network delay and video encoding/decoding may be reduced by modeling portions of the video image into a low-latency version of the video, and morphing this low-latency version with a conventional (large-latency) video.

2. Related Art

During two-way video conversations, network delays and the time required for video encoding/decoding may result in latency and jitter. Discernible pauses due to significant round-trip delay may also occur, making video conferencing unpleasant or confusing.

Video transmission delay is caused by a combination of: a) pre-coding scene analysis, b) coding time, c) large first-in, first-out (FIFO) buffers (VBV) designed to smooth transmission of variable sizes of compressed frames, and d) decoding time, along with inherent delays caused by camera acquisition and display time. These delays may combine to create delays with a time-duration of a large fraction of a second (up to half a second) in video that is being both transmitted and received on both sides of a video conference. While some of the components of this delay may be engineered to be somewhat smaller, a trade-off exists between factors including image quality, system complexity, processing power and fragility to input signal changes.

Network transmission time is another delay that compounds the video transmission delay. Network transmission time issues may include a combination of transmission latency and jitter. Because video is coded differentially, at a fixed frame rate, each frame must conventionally be received and decoded before starting on a next frame (otherwise errors in the final image may result). For this reason, an additional level of buffering delay is introduced prior to packets reaching a decoder. If the amount of buffering is reduced, an increase in the frequency of discernible errors in video due to jitter may be increased. A conventional approach to reducing network latency and jitter is to use a higher quality of service (QoS) network path (if one exists), which may be offered for instance in a 4G network. However, such high-QoS paths are generally relatively limited and costly in terms of network resources and management configurations.

While an audio stream generally does not suffer from the same effects of high-latency issues that video streams experience, a received audio-video stream may suffer from "lip-synchronization" issues where the image of a person speaking does not precisely match the audio channel.

In recent years, great strides have been made in computer analysis of the human body. For instance, well-known 3-D cameras, or 2-D image-plus-depth cameras may generate detailed models of a subject's face (using over 100 facial "landmarks") and skeletal body position in less than a frame of time. FIG. 1 shows an example of this conventional technology, where a raw image 100 of a person's face is assigned landmarks 102 (indicated by the labeled numbers 1 through 86). Model information may also be gleaned from the raw video 100 to produce a model of the person's face 104 using the model information in accordance with conventionally methods, as shown in FIG. 2. As shown in FIG. 3, a person's body position may also be modeled 106 by assigning landmarks to the person's skeletal joints using conventional methods.

FIG. 6 shows an example of a conventional method of morphing and texture mapping a two-dimensional object. Specifically, a two-dimensional object 500 may be extracted from an original image, and the image 500 may then be distorted into another shape (i.e., a morphed object 500a) that may fit onto a background image 502. A texture of the morphed object 500a may also be adjusted and/or blended with the background 502 (thus producing a morphed/texture mapped image 500a). A morphed/texture mapped image 500a may also be referred to as a 'warped' image.

SUMMARY OF INVENTION

Example embodiments provide a system and/or method for reducing latency in two-way video conversations over a wireless network by modeling portions of the video scene. Modeling may be accomplished by creating small amounts of shape information of the video scene that may describe only a portion of the video (or alternatively, modeling may be used for the entire video). Transmission of this model information data may occur over a low-latency network path. Morphing may be used to meld the conventionally transmitted (large latency) video with the model information data (describing a portion of the video) to create a final, low-latency video.

At least one embodiment includes a method of producing a low-latency video, comprising modeling, by one or more processors, a select portion of original video data, on a frame-by-frame basis, to produce model information, and transmitting the original video data and the model information data over a network.

At least another embodiment includes a method of producing a low-latency video, comprising receiving original video data and model information data, the model information data being model information, on a frame-by-frame basis, of a select portion of the original video data, generating, by one or more processors, difference information data based on a current frame of the model information data and one or more previous frames of the model information data, and producing the low-latency video based upon the difference information data.

At least another embodiment includes a system, comprising a camera configured to generate original video data for transmission over a first channel of a network, and a modeler configured to model a select portion of the original video data, on a frame-by-frame basis, to produce model information for transmission over a second channel of a network, wherein the second channel has a higher quality-of-service (QoS) than the first channel.

At least another embodiment includes a device, comprising a morpher, and a controller configured to cause the morpher to, receive original video data and model information data, the model information data being model information, on a frame-by-frame basis, of a select portion of the original video data, generate difference information data based on a current frame of the model information data and one or more previous frames of the model information data, and produce a low-latency video based upon the difference information data.

At least another embodiment includes a non-transitory computer-readable medium having a program including instructions for causing a computer to perform any of the methods described above.

At least another embodiment relates to a computer program adapted to perform the previously mentioned method embodiments.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
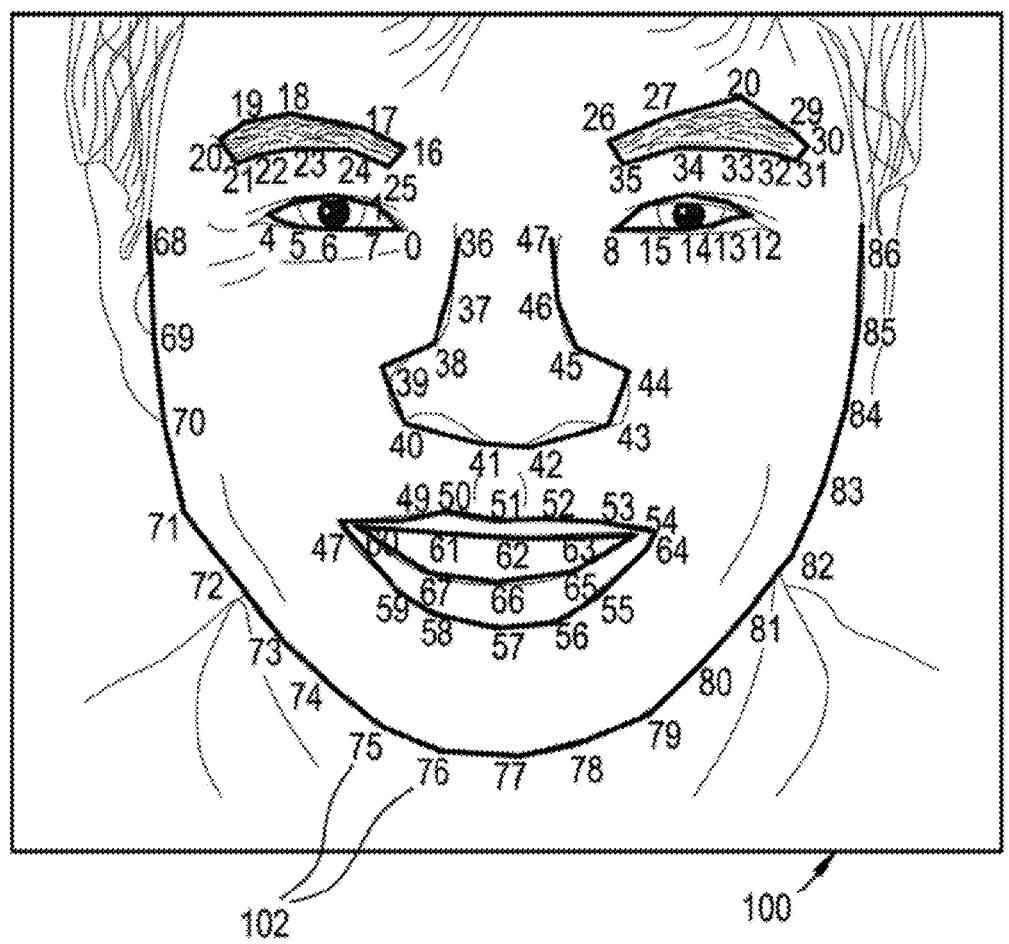
FIG. 1 is a raw video image of a person's face with superimposed landmarks that are assigned to the image, using conventional methods.
Figure 2:
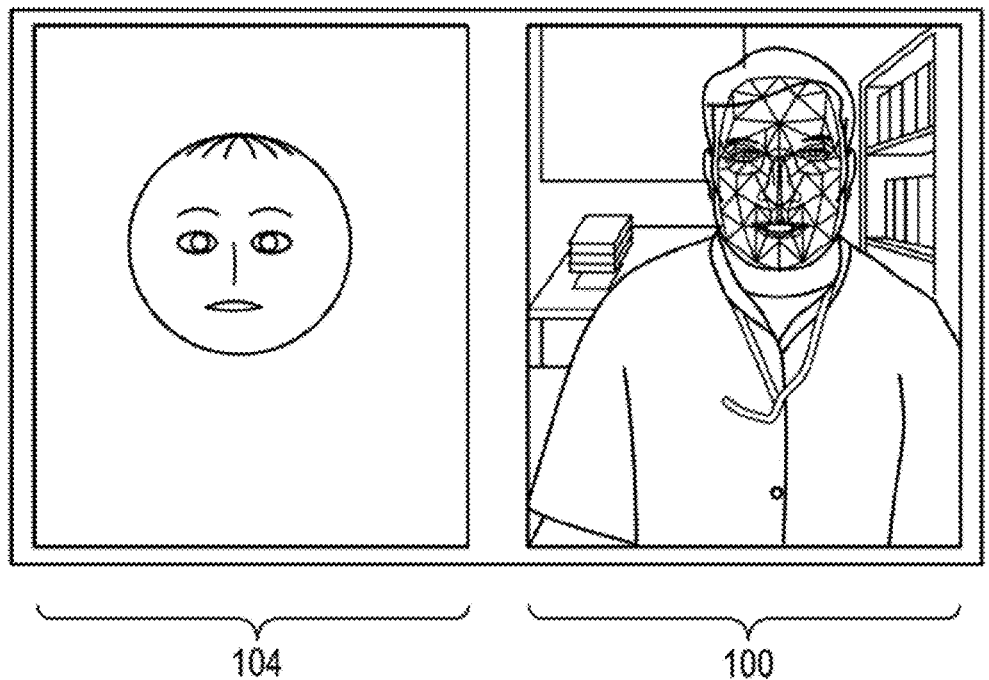
FIG. 2 is an image of a raw video image next to a model of a person's face, using conventional methods.
Figure 3:
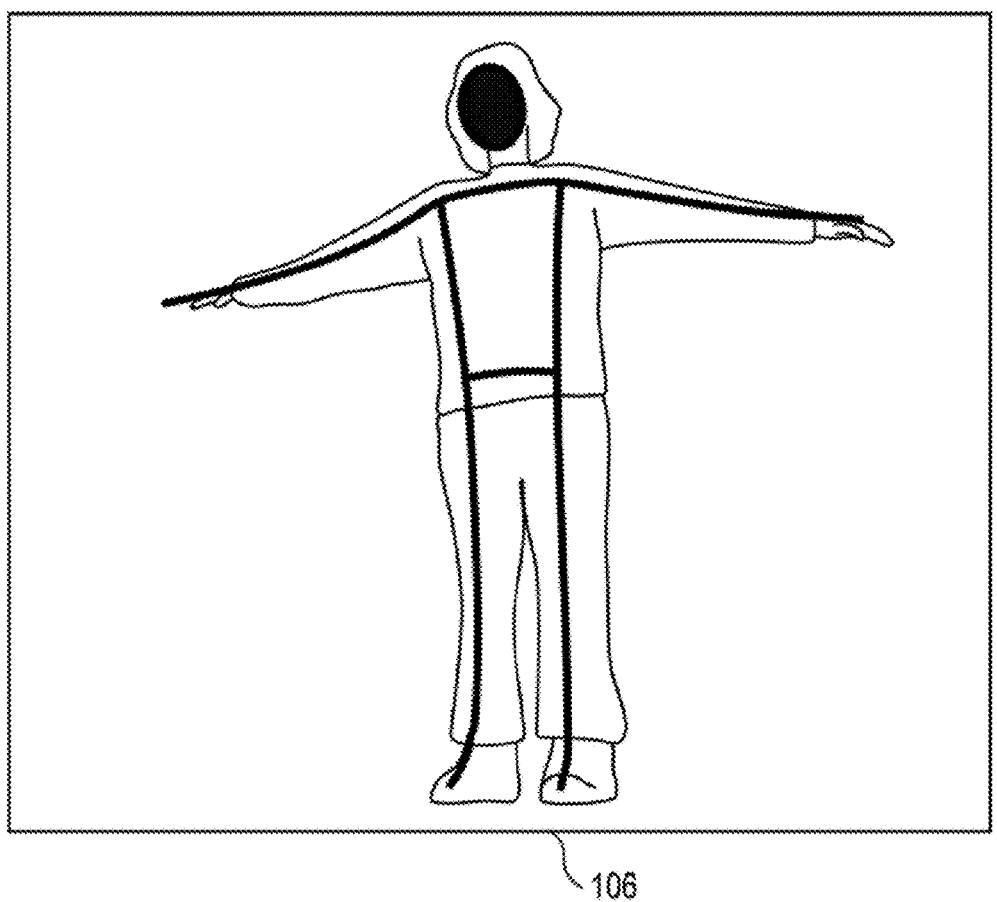
FIG. 3 is a model of a person's skeletal position, using conventional methods.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 4A:
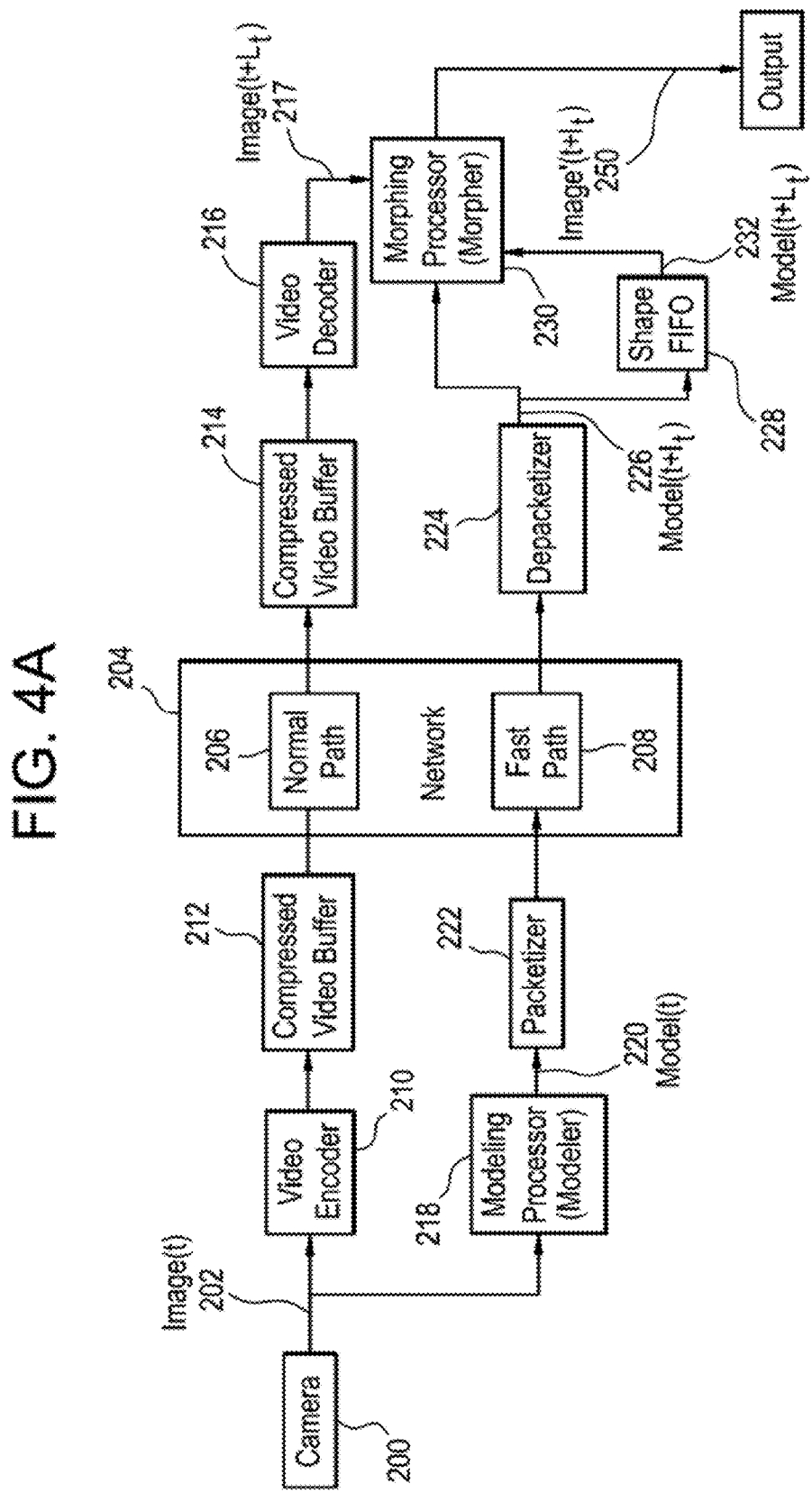
FIG. 4A is a system for producing a low-latency video, in accordance with an example embodiment.

FIG. 4A is a system for producing a low-latency video, according to an example embodiment. The system may include a video camera 200 that may produce a raw video image 202 at time t. The raw video may be split into two basic paths for transmission over a network 204 (which may be a wireless network): 1) a normal path 206, which may include conventional (large latency) video data over a normal network channel, and 2) a fast path 208, which may include model information data that is gleaned from the raw video 202 over a faster network channel of the network 204. The faster network channel may be a higher quality of service (QoS) channel as compared to the normal channel, meaning that the faster network channel may have a higher bandwidth, may be transmitted using a greater transmission power, may be transmitted at a greater transmission rate, or may generally be more reliable than the normal channel. The normal path 206 may include a video encoder 210 that encodes and compresses pixel data of the raw video (using compression standards such as H.264). A compressed video buffer 212, that may be a first-in, first-out (FIFO) buffer, may receive the encoded video in order to prepare the raw video data for transmission over the normal path 206. On a receiver side, the normal path 206 may include a FIFO compressed video buffer 214. The buffered video data from the compressed video buffer 214 may be sent to a video decoder 216 that decodes and decompresses the raw video data. Latency $L_t$ is the duration of time for the raw video data 202 to leave camera 200 and travel along normal path 206 prior to exiting decoder 216. Therefore, the decoded raw video 217 leaving the decoder is a video image of the raw video (originally captured via camera 200 at time t) that is decoded at time $t+L_t$.

The fast path 208 may include a modeling processor (modeler) 218 that analyzes pixel data of the raw video 202 to assign landmarks to the raw video data (such as the landmarks shown in FIG. 1). The modeler 218 may, for instance, be a face analysis modeler that focuses on a person's face that may be included in the raw video data 202. Alternatively to the face analysis modeler, the modeler 218 may instead be designed to focus on other specific portions of the overall raw video data 202 (besides a person's face, or in addition to also potentially focusing on a number of peoples' faces).

Figure 5:
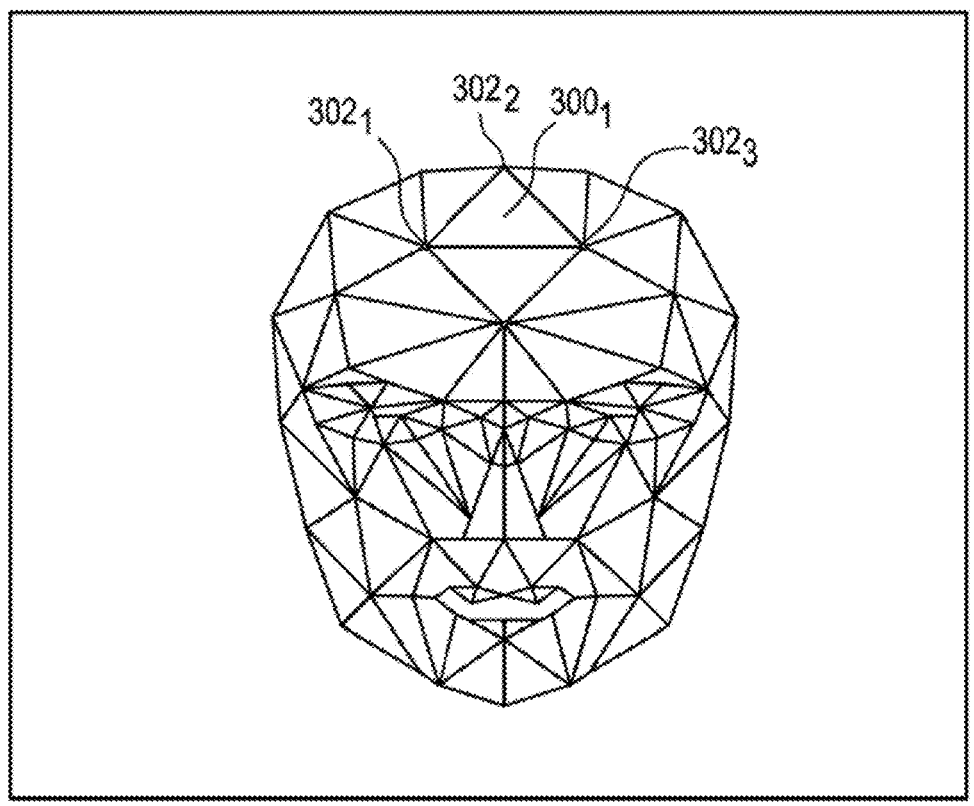
FIG. 5 is a model of a person's face using image pel locations that define non-overlapping triangular regions, in accordance with an example embodiment.

Model information 220 leaving modeler 218 may be transmitted in several forms. First, this model information 220 may be image pel locations (i.e., x/y-axis locations) that are described using x/y-axis coordinates. Second, the model information 220 may be in the form of three-dimensional spatial locations, using x/y/z-axis coordinates that can be translated using basic geometry into image pel locations, if information of the camera parameters (resolution, orientation, focal length) is available. Third, this model information 220 may be in the form of a list of face model parameters (that may be defined by animation units, AU, and shape units, SU, using well-known methods, such as the modeling methods defined at hap://www.icg.isy.liu.se/candide/, that can be reinterpreted into three-dimensional spatial locations of facial landmarks that are then translated into image pel locations. Given the locations of the facial landmarks, non-overlapping triangular regions $300_n$ (where n may be an integer from 1 to N, with N being the total number of triangular regions) may be used to define a person's face (if a person's entire face is being modeled, for instance), as shown in FIG. 5. Each triangular region $300_n$ of FIG. 5 is defined by three image pel locations $302m$ (where m is an integer from 1 to M, where M is the total number of image pel locations), in order to completely a model of a person's facial area.

The modeler 218 may output model information data 220 to a packetizer 222 that selectively packetizes only data pertaining to a shape of a person's mouth that is found within the overall model information data 220 of a person's face. The packetizer 222 may alternatively packetize other select portions of the overall model information data 220, other than the shape of the person's mouth (or, in addition to the shape of a person's mouth), such as a person's eyes, movement of their head, hands, and the remainder of a person's body. Additionally, the packetizer 222 may packetize all of the model information data 220 pertaining to a person's face or even their entire body (while a background behind the person's body may or may not need to be modeled), understanding that a greater bandwidth delay period may be required for a greater amount of model information data that is packetized and transmitted by the packetizer 222 (although model information is typically significantly less than the size of an IP packet, and therefore any additional bandwidth that may be required would have a fairly negligible impact on causing extra delays).

Data leaving the packetizer 222 may be transmitted over network 204 via fast path 208. Fast path 208 may be a more reliable, lower-latency path, as compared to the normal path 206. Additionally, the fast path 208 does not include an encoder/decoder and video buffer (unlike normal path 206), thereby further increasing the speed of data transmission along fast path 208. The data transmitted over fast path 208 may be depacketized by a depacketizer 224, whereupon model information may then be sent to a shape buffer 228 where modeled shape information may be buffered on a first-in, first-out (FIFO) basis. Because there is a latency duration $l_t$ associated processing video data through packetizer 222, fast path 208, and depacketizer 224, the model information 226 leaving depacketizer 224 is transmitted from the depacketizer 224 at a time t+$l_t$. It should be understood that because fast path 208 may transmit data faster than normal path 206, and because the overall amount of data being transmitted over fast path 208 may be smaller than the amount of data being transmitted over normal path 206 (thereby reducing encoding/decoding time), latency $l_t$ (the fast path latency) may be smaller than latency $L_t$ (the normal path latency). The shape FIFO 228 may store the most recently available model information 232 (corresponding to time t+$L_t$) for use by morphing processor (morpher) 230.

Figure 6:
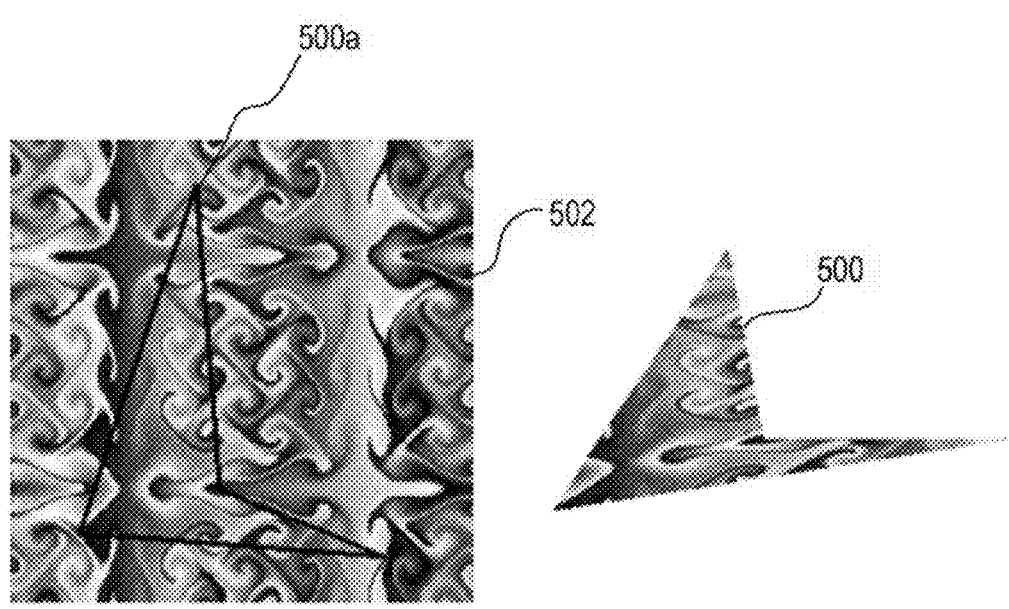
FIG. 6 depicts a conventional method of morphing and texture mapping a two-dimensional image.

A non-linear image construction morpher 230 (using well-known methods of morphing/texture mapping, such as the methods described in "Real-Time Rendering," 2nd edition, by Tomas Akenine-Moller & Eric Haines, 2002 (ISBN 1-56881-182-9, Chapter 5, p. 117-180)) may then be used to produce a low-latency video 250 (see FIG. 6 for an example of morphing/texture mapping). The low-latency video 250 is a melding of actual raw video data 217 with a frame-by-frame estimation of a select portion of the raw video (found in a comparison of models 226/232). Therefore, the purpose of morpher 230 is to generate an estimation of a portion of video data using a comparison of current and previous models (or image models) through the use of the modeling information data. Specifically, morpher 230 produces each frame-by-frame low-latency image of the low-latency video 250 by combining a prior image (image (t+$L_t$) 217 leaving decoder 216) of raw video data with information on the select portion of the raw video that is obtained by determining a difference between locations of key facial landmarks in one or more previously modeled images (for instance, model (t+$L_t$) 232 leaving buffer 228) to a current modeled image (model (t+$l_t$) 226 leaving depacketizer 224). The difference information of the select portion of the raw data allows only this select portion of a frame-by-frame image (of only a person's head, or the person's lips) to be estimated, via a 'warping' (morphing and texture mapping) operation that creates a set of estimated pel locations (see a discussion of pels in relation to FIG. 5, described above) corresponding to triangular regions defined by current facial landmarks. The 'warping' operation (which is conventionally used in texture mapping of computer graphics where a source image is distorted to represent the surface of an object) is therefore defined by starting and ending triangular regions, that may be represented as a matrix transformation corresponding to a two-dimensional skew together with a two-dimensional translation. The morpher 230 therefore combines estimated portions of video (via the use of model information data) with the decoded raw video 217 to produce the low-latency video 250.

Figure 4B:
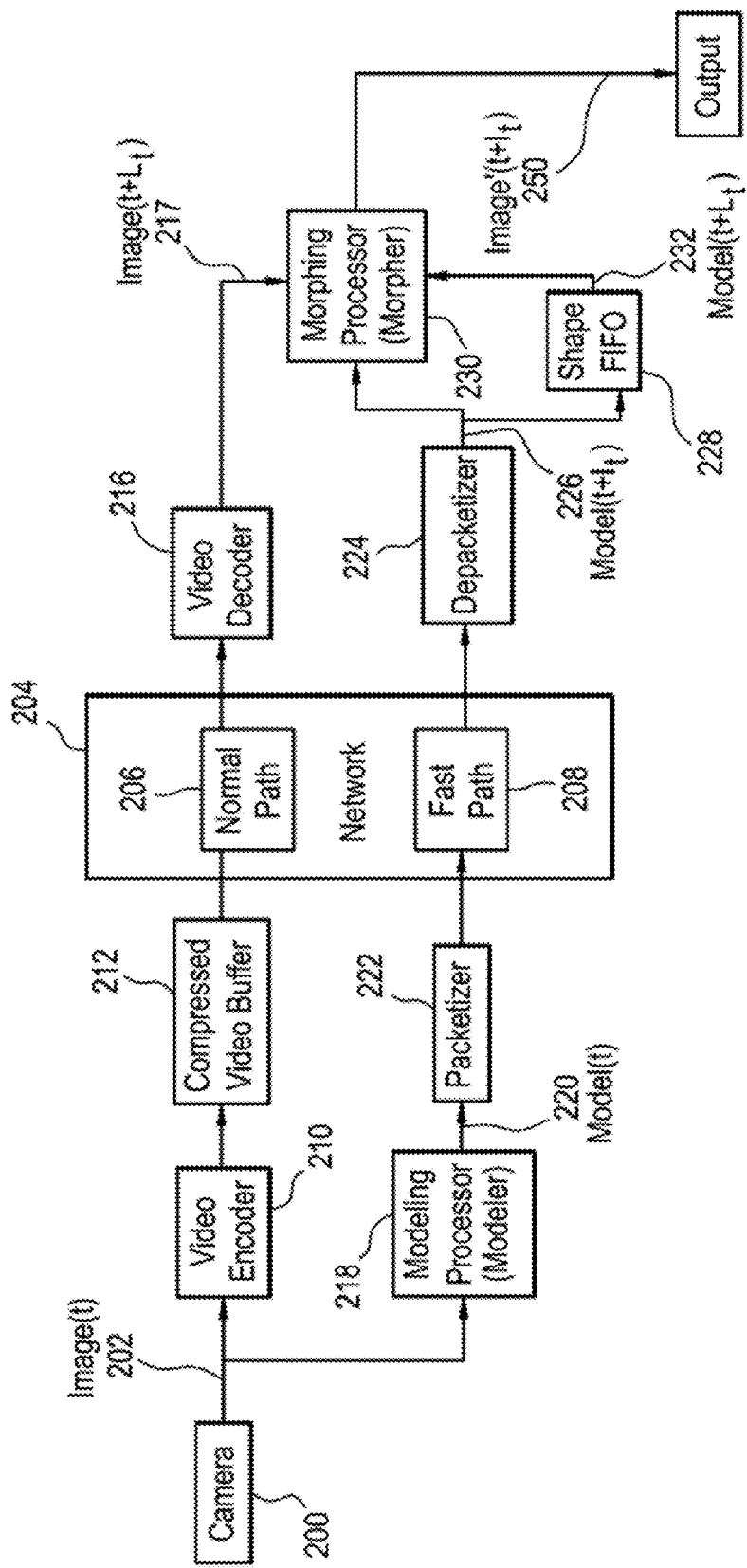
FIG. 4B is another system for producing a low-latency video, in accordance with an example embodiment.

FIG. 4B is another system for producing a low-latency video, in accordance with an example embodiment. FIG. 4B is nearly identical to FIG. 4A, and for this reason the redundant elements of FIG. 4B are not again described here, for brevity sake. However, the embodiment of FIG. 4B does not include a video buffer prior to the video decoder 216 (for comparison, see the video buffer 214 of FIG. 4A). By removing the buffer, a delay associated with collecting and ordering the video data packets (through the normal actions of a FIFO buffer) may be avoided. Therefore, the flow of video data from encoder 210 through decoder 216 (along normal path 206) may occur more quickly, with less overall latency. Because the flow of video data along normal path 206 generally experiences greater latency than the model information data traveling along fast path 208, the increased speed of video data transmission via the removal of buffer 214 (as shown in FIG. 4A) provides less latency delays for the overall production of the low-latency video 250. However, this decrease in the overall latency of video 250 includes a potential trade-off, as removal of buffer 214 may degrade the quality of the portion of video 250 that are not modeled, in the event that propagation issues along normal path 206 cause significant instances of out-of-order video data packets arriving at decoder 216 (as buffer 214 would normally reduce jitter by reordering received packets). But, the portions of video 250 that are modeled are unaffected by jitter, such that the overall quality of video 250 depends on how much the video 250 is model predicted.

Figure 4C:
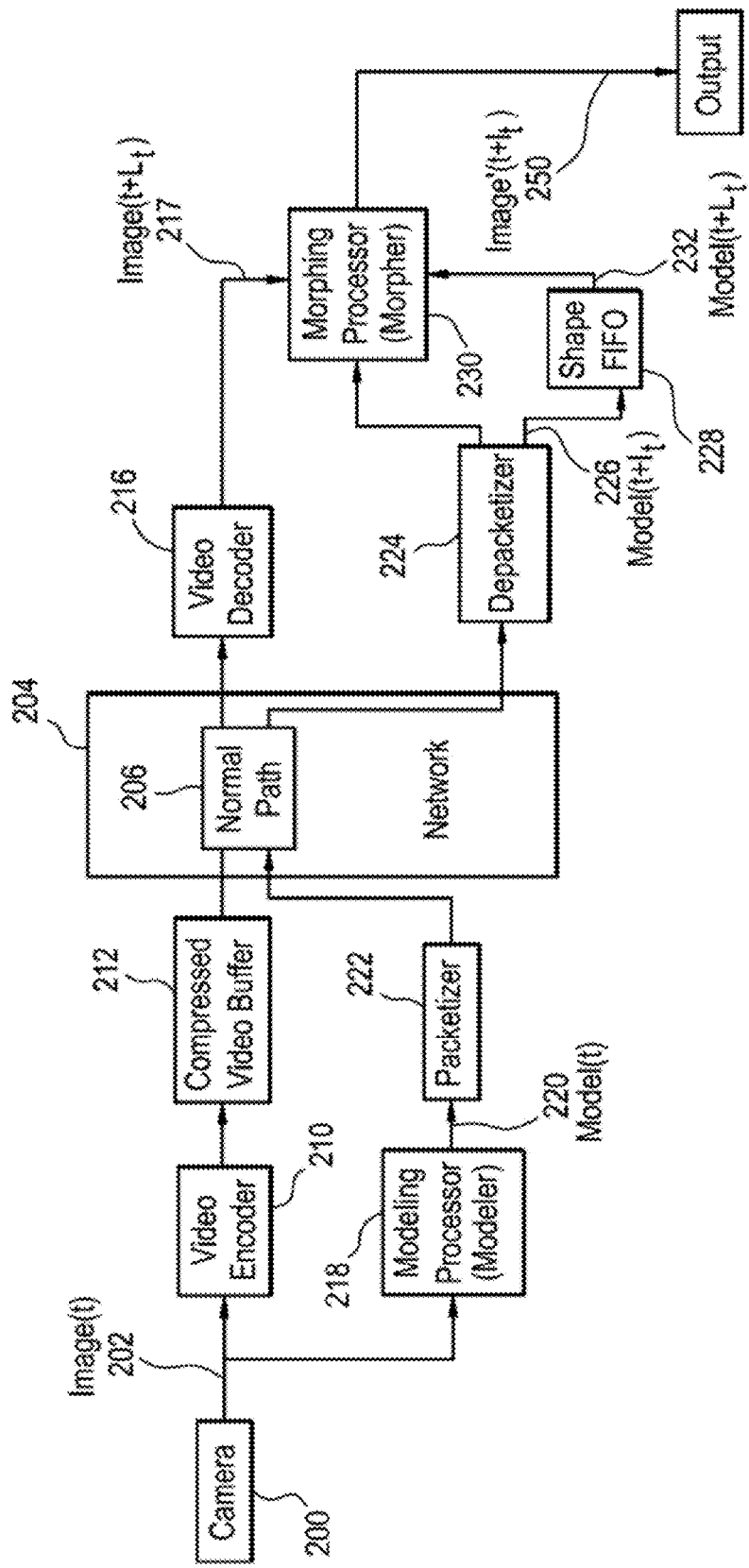
FIG. 4C is another system for producing a low-latency video, in accordance with an example embodiment.

FIG. 4C is another system for producing a low-latency video, in accordance with an example embodiment. FIG. 4C is nearly identical to FIG. 4B, and for this reason the redundant elements of FIG. 4C are not again described here, for brevity sake. However, the embodiment of FIG. 4C does not include a separate fast path (see fast path 208 in FIG. 4B) traveling through network 204. Instead, packetizer 222 transmits model information data through normal path 206 and then onto depacketizer 224. This embodiment allows modeling of select portions of the raw video image 202 even in the event that network 204 does not provide for a more reliable high quality-of-service (QoS) fast path (similar to the fast path 208 of FIGS. 4A/B). By removing the fast path, the model information data transmitted from packetizer 222 arrives at morpher 230 more slowly and less reliably. However, because the model information data may be a smaller amount of data information (as compared to the video data that travels from encoder 210 through decoder 216), and because the model information does not go through an encoder/decoder and video buffer (unlike the portions of video that are not modeled), the model information data still arrives at the morpher 230 ahead of the video data. Therefore, this embodiment still may allow for estimates to be made to select portions of the low-latency video 250 (which may be estimated using the model data information leaving depacketizer 224).

The embodiment of FIG. 4C may optionally include a video buffer (similar to the video buffer 214 in FIG. 4A) upstream of video decoder 216, in order to further reduce the possibility of jitter that may otherwise occur in the low-latency video 250 (in the event that a significant amount of out-of-order video data is being received at decoder 216).

Figure 7:
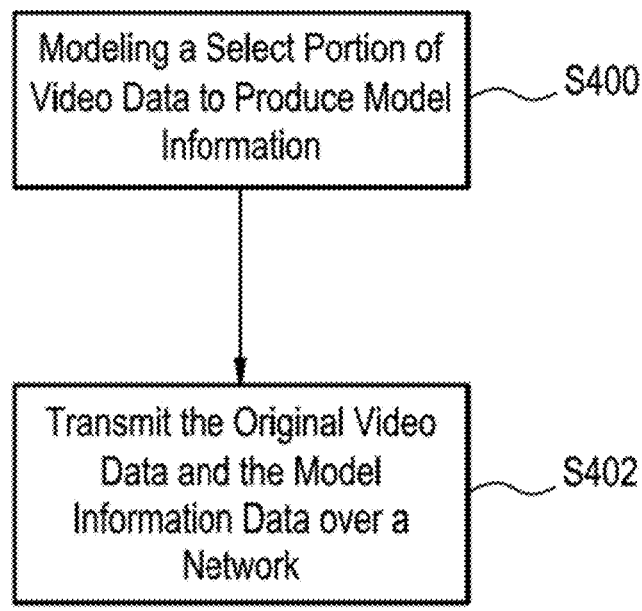
FIG. 7 is a flowchart of a method of producing a low-latency video, in accordance with an example embodiment.

FIG. 7 is a flowchart of a method of producing a low-latency video, in accordance with an example embodiment. The method may include a step S400 (at modeler 218 of FIG. 4A) of modeling a select portion of original video data to produce model information data (model (t) 220). This modeling is accomplished on a frame-by-frame basis. In step S402, the original video data and the model information data may be transmitted over a network. The transmission of the original video data and the model information data may occur over a same network channel (as is shown in FIG. 4C), or over two separate channels (as is shown in FIGS. 4A/B). In the event that two separate channels are used, the transmission of the model information data may be sent over a channel with a higher QoS, as compared to the channel that is used to transmit the original video data.

FIG. 7 is another flowchart of a method of producing a low-latency video, in accordance with an example embodiment. The method may include a step S500 (at the morpher 230) of receiving original video data and model information data, where the model information may be a model (on a frame-by-frame basis) of a select portion of the original video data. The method may also include a step S502 (at morpher 230) of generating difference information data based on a current frame of the model information data (model (t+l$_t$) 226) and one or more previous frames (model (t+L$_t$) 232) of the model information data. In step S504 (at morpher 230), the low-latency video 250 may be produced based upon the difference information.

Figure 8:
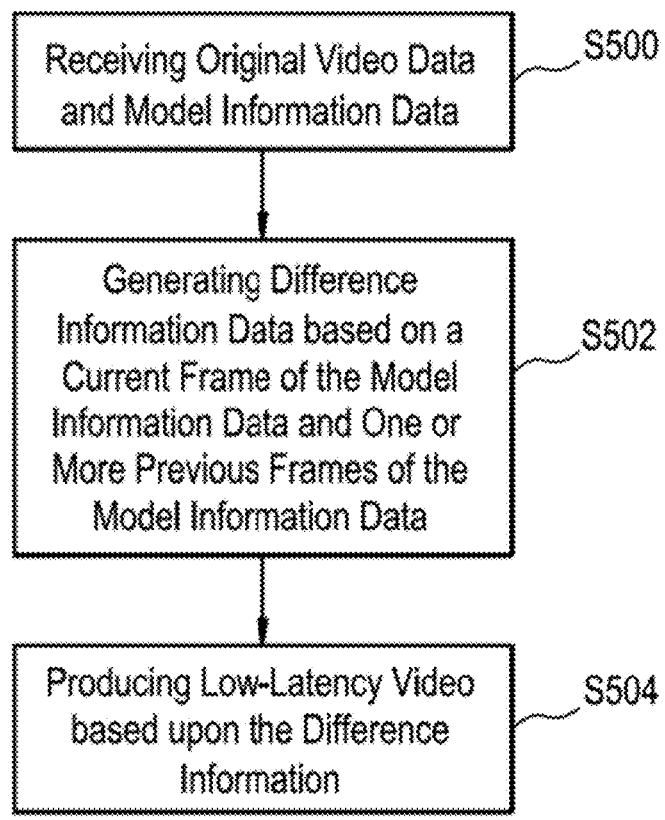
FIG. 8 is another flowchart of a method of producing a low-latency video, in accordance with an example embodiment.

As stated above, the methods of FIGS. 7 and 8 may be modified in order to model all of the video data (that is to say, the select portion of the video data may include all of the video data).

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of producing a low-latency video, comprising:
    modeling, by one or more processors, a select portion of original video data, on a frame-by-frame basis, to produce model information; and
    transmitting the original video data and the model information data over a network.

2. The method of claim 1, wherein,
    the transmitting of the original video data is accomplished over a first channel of the network,
    the transmitting of the model information data is accomplished over a second channel of the network.

3. The method of claim 2, wherein the second channel has a higher quality-of-service (QoS) than the first channel.

4. The method of claim 2, wherein the first channel and the second channel are the same channel.

5. The method of claim 2, further comprising:
    encoding and buffering the original video data before transmitting the original video data over the first channel of the network,
    wherein the model information data is not encoded and not buffered before transmitting the model information data over the second channel of the network.

6. The method of claim 1, wherein the modeling of the select portion of original video data includes,
    analyzing pixel data of the original video data,
    assigning landmarks to the pixel data,
    partitioning the select portion of the video data into one or more non-overlapping model regions defined by image pel locations.

7. A method of producing a low-latency video, comprising:
    receiving original video data and model information data, the model information data being model information, on a frame-by-frame basis, of a select portion of the original video data;
    generating, by one or more processors, difference information data based on a current frame of the model information data and one or more previous frames of the model information data; and
    producing the low-latency video based upon the difference information data.

8. The method of claim 7, wherein the producing of the low latency-video further includes,
    estimating the select portion of the original video data based on the difference information data to produce estimated information data for the select portion of video data; and
    combining, by the one or more processors, the estimated information data with the original video data to produce the low-latency video.

9. The method of claim 8, wherein the model information data includes one or more non-overlapping model regions that are each defined by image pel locations.

10. The method of claim 9, wherein the generating step includes,
    comparing image pel locations of a current frame of the model information data to one or more previous frames of the model information data for the one or more non-overlapping model regions to determine changes in a shape of the one or more non-overlapping model regions, the changes in the shape of the one or more non-overlapping model regions being the difference information data.

11. The method of claim 10, wherein the estimating step includes,
    applying a warping operation to an image of the one or more non-overlapping model regions, based on the changes in the shape of the one or more non-overlapping model regions.

12. The method of claim 11, wherein the combining step includes,
    replacing the select portion of original video data with the one or more warped, non-overlapping model regions within the original video data to produce the low-latency video.

13. The method of claim 7, wherein,
    the receiving of the original video data includes receiving the original video data over a first channel of a network,
    the receiving of model information data includes receiving the model information data over a second channel of the network.

14. The method of claim 13, wherein the second channel has a higher quality-of-service (QoS) than the first channel.

15. The method of claim 13, further comprising:
    decoding the received original video data, wherein the received model information data is not decoded; and
    buffering the received original video data.

16. A system, comprising:
    a camera configured to generate original video data for transmission over a first channel of a network; and
    a modeler configured to model a select portion of the original video data, on a frame-by-frame basis, to produce model information for transmission over a second channel of a network,
    wherein the second channel has a higher quality-of-service (QoS) than the first channel.

17. A device, comprising:
    a morpher; and
    a controller configured to cause the morpher to,
        receive original video data and model information data, the model information data being model information, on a frame-by-frame basis, of a select portion of the original video data,
        generate difference information data based on a current frame of the model information data and one or more previous frames of the model information data, and
        produce a low-latency video based upon the difference information data.

18. The device of claim 17, wherein the controller is further configured to, estimate the select portion of the original video data based on the difference information data to produce estimated information data for the select portion of video data, combine the estimated information data with the original video data to produce the low-latency video.

19. The device of claim 18, wherein, the model information data includes one or more non-overlapping model regions that are each defined by image pel locations, the controller is configured to generate the difference information by comparing image pel locations of a current frame of the model information data to one or more previous frames of the model information data for the one or more non-overlapping model regions to determine changes in a shape of the one or more non-overlapping model regions, the changes in the shape of the one or more non-overlapping model regions are the difference information data.

20. The device of claim 19, wherein the controller is configured to, estimate the select portion of the original video data by applying a warping operation to an image of the one or more non-overlapping model regions, based on the changes in the shape of the one or more non-overlapping model regions, combine the estimated information data with the original video data by replacing the select portion of original video data with the one or more warped, non-overlapping model regions within the original video data to produce the low-latency video.

* * * * *